(12) United States Patent
Miyazaki et al.

(10) Patent No.: US 6,755,226 B2
(45) Date of Patent: Jun. 29, 2004

(54) COMPOSITE CORD AND PNEUMATIC TIRE USING THE COMPOSITE CORD

(75) Inventors: Shinichi Miyazaki, Kobe (JP); Osamu Toda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/773,356

(22) Filed: Feb. 1, 2001

(65) Prior Publication Data

US 2001/0011569 A1 Aug. 9, 2001

(30) Foreign Application Priority Data

Feb. 1, 2000 (JP) ........................................ 2000-023887

(51) Int. Cl.[7] .............................. B60C 9/02; D02G 3/02; D02G 3/48
(52) U.S. Cl. ...................... 152/451; 152/527; 152/556; 57/200; 57/225; 57/243; 57/252; 57/255; 57/902
(58) Field of Search ................................. 152/451, 527, 152/556; 57/200, 902, 210, 225, 232, 236, 238, 243, 255, 258

(56) References Cited

U.S. PATENT DOCUMENTS

| | | | | |
|---|---|---|---|---|
| 3,686,855 A | * | 8/1972 | Falcy et al. ................... | 57/212 |
| 4,848,431 A | * | 7/1989 | Kobayashi et al. ......... | 152/548 |
| 5,279,695 A | * | 1/1994 | Starinshak et al. ......... | 152/451 |
| 5,551,498 A | * | 9/1996 | Komatsuki .................. | 152/451 |

FOREIGN PATENT DOCUMENTS

| | | |
|---|---|---|
| BE | 900 175 | 11/1984 |
| DE | 41 25 887 | 2/1993 |
| EP | 1 033 435 | 9/2000 |
| JP | 06049784 | * 2/1994 |
| WO | WO 8502210 | * 5/1985 |

OTHER PUBLICATIONS

Kim, Dong and Paris, Henry, "Metallurgy, Processing and Applications of Metal Wires". TMS Publications, Oct. 6–10, 1996; pp. 78–79.*

* cited by examiner

Primary Examiner—Jeff H. Aftergut
Assistant Examiner—Justin Fischer
(74) Attorney, Agent, or Firm—Birch, Stewart, Kolasch & Birch, LLP

(57) ABSTRACT

A composite cord is provided which is simple in manufacture, highly productive, less costly, and improved in rubber penetration. The composite cord has a 1×n construction (n is an integer from 3 to 12) with 2 to 11 metallic filaments and 1 to 5 polymer fibers having a melting point of 50 to 200 degrees twisted together. The pneumatic tire employing this composite cord for its reinforcing element is restricted in rust formation and improved in strength retention.

14 Claims, 4 Drawing Sheets

COMPOSITE CORD AND PNEUMATIC TIRE USING THE COMPOSITE CORD

BACKGROUND OF THE INVENTION

1. Field of the Invention

The present invention relates to a composite cord formed of metallic filaments and polymer fiber twisted together, and a pneumatic tire using the composite cord for its reinforcing element.

2. Description of the Background Art

For a reinforcing element of a pneumatic tire, e.g., for its carcass, belt structure, or bead portion reinforcing layer, a metal cord formed by twisting metallic filaments together is often employed. As such a metal cord, a compact cord is used which is made of metallic filaments "f" that are filled tight together to allow no gaps between neighboring filaments, of which cross section is shown in FIG. 5. When this compact cord is embedded in rubber to manufacture a reinforcing ply, however, the rubber cannot penetrate into voids created among the filaments. This allows water to enter the voids, so that rust will form therein, which may propagate along the longitudinal direction of the cord. This deteriorates adhesion strength between the cord and the rubber as well as the strength of the cord, thereby causing break of the cord in the tire at running.

In order to solve the problem above, a so-called open cord has been proposed which is made of metallic filaments "f" twisted together in such a way that gaps are formed therebetween, of which cross section is shown in FIG. 6.

Another metal cord has also been proposed, of which cross sectional structure is shown in FIG. 7, which is formed by twisting metallic filaments "f1" preformed into a three-dimensional spiral shape and not-preformed metallic filaments "f2" together to form gaps therebetween. Such gaps around the filaments improve rubber penetration into the interior of the cord.

When manufacturing these metal cords, however, twisting becomes complicated in order to form gaps between metallic filaments, or an additional step of preforming the filaments is required, so that productivity is degraded and the manufacturing cost tends to increase. Further, a preformed metallic filament is relatively poor in strength and rigidity, and its diameter inevitably increases. A ply with such metal cords embedded in rubber is likely to curl up, which makes tire molding difficult.

SUMMARY OF THE INVENTION

An object of the present invention is to provide a composite cord that can be fabricated in a simple process at low cost and with high productivity, and is improved in rubber penetration. Another object of the present invention is to provide a pneumatic tire employing the composite cord.

According to an aspect of the present invention, the composite cord has a 1×n construction (n is an integer from 3 to 12) made of from 2 to 11 metallic filaments and from 1 to 5 polymer fibers having a melting point of from 50° C. to 200° C. twisted together.

According to another aspect of the present invention, the metallic filament has a diameter of from 0.15 mm to 0.45 mm.

According to a further aspect of the present invention, the polymer fiber is selected from polyethylene fiber and polypropylene fiber.

According to a still further aspect of the present invention, the pneumatic tire employs, for its reinforcing element, a composite cord having a 1×n construction (n is an integer from 3 to 12) made of from 2 to 11 metallic filaments and from 1 to 5 polymer fibers having a melting point of from 50° C. to 200° C. twisted together.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
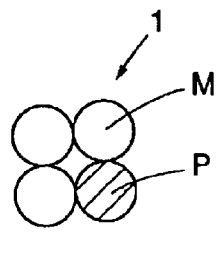
FIGS. 1A, 1B and 1C are cross sectional views of composite cords according to the present invention.
Figure 1B:
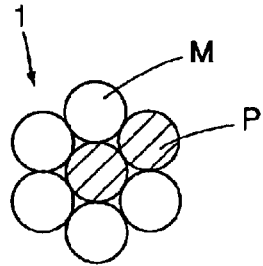
Figure 1C:
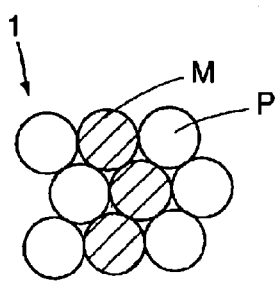

Hereinafter, embodiments of the present invention will be described with reference to the drawings. FIGS. 1A, 1B and 1C respectively show cross sectional views of composite cords of the present invention. FIG. 1A shows a composite cord of 1×4 construction, which is formed of three metallic filaments M and one polymer fiber P. FIG. 1B shows a composite cord of 1×7 construction, which is made of five metallic filaments M and two polymer fiber P. FIG. 1C shows a composite cord of 1×9 construction, which is formed of six metallic filaments M and three polymer fiber P.

The composite cord of the present invention in general is a twisted wire represented as a 1×n construction (n is an integer between 3 and 12), though from one to five out of the "n" filaments are replaced with polymer fiber. The composite cord includes at least two metallic filaments. The polymer fiber and metallic filaments are twisted together at approximately constant pitches, while being displaced from one another in a longitudinal direction to prevent any specific fiber or metallic filament from forming a core of the composite cord. If a specific metallic filament constitutes the core of the cord, for example, the metallic filaments may form a sheath about the core material, thereby creating undesirable gaps between the metallic filaments.

The twist pitch of the composite cord is preferably from 10 mm to 30 mm. If it is less than 10 mm, initial elongation of the cord tends to increase. In such a case, it becomes difficult to use the cord, e.g., for a carcass layer that serves to stabilize the shape of a pneumatic tire. A cost in the twisting process may also increase. On the other hand, if the pitch exceeds 30 mm, the cord will be easily unbound when cut, which degrades the processibility.

The metallic filament for use in the composite cord may have a round cross section, i.e., a cross section which fits substantially into a circle, or an elliptical or oval cross section. For a filament having a round cross section, the filament diameter between 0.15 and 0.45 mm is preferable. For a filament having a non-round cross section, the average of the major axis and the minor axis thereof is preferably within that range. By setting the filament diameter within the range, it is possible to add appropriate rigidity to the cord, so that desired tire performance can be realized.

The polymer fiber constituting part of the composite cord may be multiple filaments twisted together (multifilament) or one filament (monofilament). The diameter thereof is preferably 0.15 to 0.60 mm. The fiber having the diameter within this range exhibits a good effect to rubber penetration. Using one to five such polymer fiber, appropriate gaps are created in the cord, thereby ensuring desirable rubber penetration.

As the polymer fiber material, thermoplastic resin having a melting point of 50 to 200° C. may be used. Examples of such thermoplastic resin include: low-density polyethylene (melting point: 102–112° C.), medium-density polyethylene (melting point: 110–120° C.), polypropylene (melting point: about 165° C.), polymethylpentene (melting point: about 180° C.), ternary polyamide copolymer (hexaethylene adipic amide-caprolactam-lauryllactam copolymer, having a melting point determined according to the weight ratio of the three components), and ethylene-vinyl acetate copolymer.

Figure 2A:
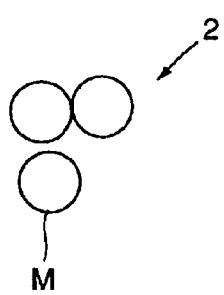
FIGS. 2A, 2B and 2C are cross sectional views of the composite cords according to the present invention, in which polymer fiber has been melted.
Figure 2B:
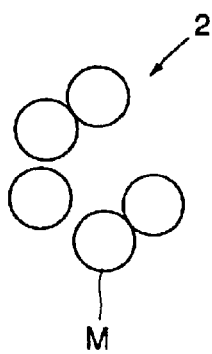
Figure 2C:
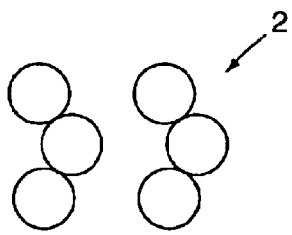

The composite cord as described above is embedded in rubber and employed for a reinforcing element of a tire. During the molding and vulcanization of the tire, the reinforcing element is placed within a mold and undergoes a temperature condition of 150 to 200° C. upon vulcanization. Though the composite cord maintains its original shape during the molding process, the polymer fiber in the cord comes to soften or melt under the condition of vulcanization. The melted material of the polymer fiber and the rubber thus coat the metallic filaments, thereby preventing formation of voids among the metallic filaments. FIGS. 2A, 2B and 2C show cross sections of the composite cords 1 in FIGS. 1A, 1B and 1C, respectively, after the polymer fiber has been softened or melted under the condition of vulcanization. In FIGS. 2A, 2B and 2C, the metallic filaments M are placed with gaps provided therebetween, while the rubber or the melted material of the polymer fiber has thoroughly penetrated into the interior of the cords. If the polymer fiber has a melting point greater than 200° C., it will not soften or melt under the condition of vulcanization. This hinders rubber penetration into the inside of the cord, so that the desired effect cannot be expected. On the other hand, if the melting point is lower than 50° C., the polymer fiber starts to flow with a slight temperature increase during the tire manufacturing process, which degrades the processibility. Thus, the melting point of the polymer fiber in a range between 100° C. and 200° C. is preferable.

The composite cord of the present invention may be embedded in the belt structure of a pneumatic tire.

Figure 3:
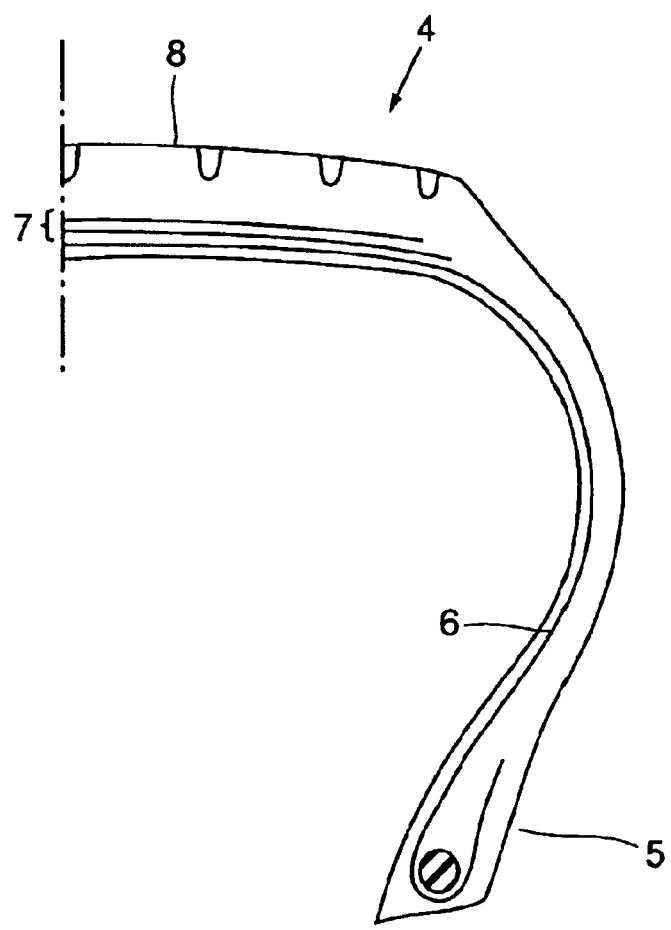
FIG. 3 is a cross sectional view of a pneumatic tire of the present invention, in which a right half thereof is shown.

FIG. 3 shows in cross section a right half of a passenger car tire according to the present invention. Referring to FIG. 3, the passenger car tire 4 includes a carcass 6 as its framework, which extends between a pair of bead portions 5 in a troidal shape. The crown portion of the carcass is reinforced by a belt structure 7 consisting of at least two plies, and further, a tread 8 is provided radially outwardly of the belt structure 7. At least one ply of belt structure 7 is formed of the composite cord described above. Although the composite cord of the present invention preferably includes 2 to 11 metallic filaments, the one including 2 to 8 metallic filaments is normally suitable for use in the belt ply of a passenger car tire. If the composite cord including just one metallic filament is used to obtain desired rigidity for the belt structure, the end count of the composite cords (i.e., the cord embedded count per unit width) within the ply should be increased. This leads to narrower spacing between the neighboring composite cords, and rubber separation is likely to occur at the respective edges of the belt ply, from the ends of the cords. Such rubber separation would propagate through neighboring composite cords, thereby causing ply separation at both edges of the belt structure.

On the other hand, if the composite cord including more than 11 metallic filaments is used, rigidity of the belt structure becomes too high, which degrades riding comfort when used for the passenger car tire. When the composite cord including 2 to 8 metallic filaments is used for the belt structure of the passenger car tire, the end count of the composite cords within a belt ply is 10 to 50, preferably 20 to 40, per 50-mm width.

For embedding the composite cord in rubber, a topping process is performed. In this process, the composite cord is covered with rubber at a temperature of 50° C. to 120° C. At this time, the polymer fiber within the cord may melt, so that the rubber easily penetrates into the voids among the metallic filaments constituting the composite cord.

Of the belt structure, at least one ply is formed of the composite cords of the present invention described above. In the case of a passenger car tire having at least two belt plies in the belt structure, the cords are disposed at an angle of 10 to 30 degrees with respect to the circumferential direction of the tire, with the cords in one ply arranged at an opposed direction to those in the adjacent ply. In the case of a truck or bus tire normally having four plies in the belt structure, the cord angle is set in a range between 5° and 70°.

The composite cord of the present invention is also applicable to the carcass of a truck or bus tire.

Figure 4:
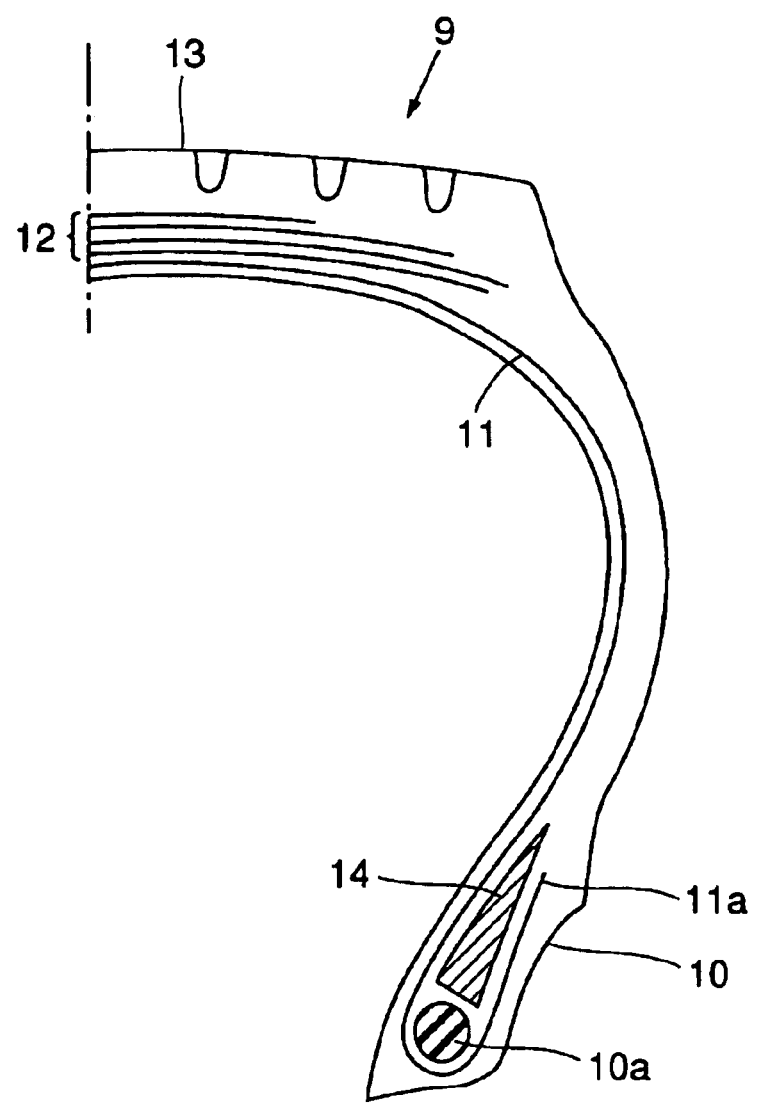
FIG. 4 is a cross sectional view of another pneumatic tire of the present invention, in which a right half thereof is shown.
Figure 5:
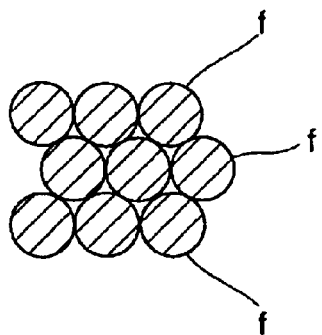
FIG. 5 is a cross sectional view of a conventional compact type steel cord.
Figure 6:
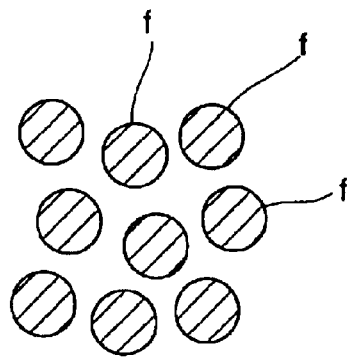
FIG. 6 is a cross sectional view of a conventional open cord.
Figure 7:
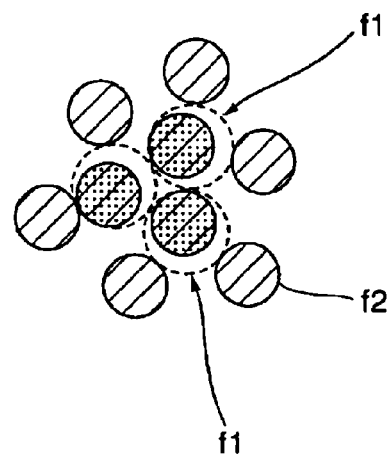
FIG. 7 is a cross sectional view of a conventional preformed cord.

FIG. 4 shows in cross section a right half of the pneumatic radial tire for use in a truck or bus according to the present invention. Referring to FIG. 4, the pneumatic radial tire 9 includes a carcass 11 as its framework, which extends between a pair of bead portions 10 in a troidal shape. The crown portion of the carcass is reinforced with a belt structure 12 consisting of four plies, and a tread 13 is provided radially outwardly of belt structure 12. A bead apex 14 is further provided between carcass 11 and its turn-up portion 11a. A ply constituting the carcass 11 is formed of the composite cords described above. Although the composite cord of the present invention includes 2 to 11 metallic filaments, the one including 3 to 10 metallic filaments is normally suitable for the carcass ply of the pneumatic radial tire for use in a truck or bus. In order to impart desired rigidity to the carcass, the end count of the composite cords in the ply needs to be adjusted. If the number of metallic filaments included in the composite cord is small, spacing between the composite cords narrows. This may cause abrasion of the cords due to friction therebetween, or rubber separation from the turn-up portion 11a of carcass 11. The rubber separation tends to propagate through neighboring cords, thereby inducing ply separation at the end of the carcass turn-up portion.

On the other hand, if the number of metallic filaments included within the composite cord exceeds 11, it becomes difficult to realize desirable rubber penetration into the center of the cord. When the carcass ply is formed using the composite cord including 2 to 11 metallic filaments, the end count of the composite cords per 50-mm width of the carcass ply is 10 to 55, preferably 20 to 45.

For embedding the composite cord in rubber, the topping process is conducted, as in the application to the belt ply. In this process, the cord is covered with rubber at a temperature between 50° C. and 120° C., and the polymer fiber within the cord melts, as described above. This facilitates rubber penetration into the voids among the metallic filaments constituting the composite cord. The carcass ply thus obtained is advantageous in that curling thereof during the subsequent process steps as well as unbinding of the metallic filaments therein is prevented.

In the present invention, the carcass is formed of at least one ply, and at least one carcass ply is formed of the composite cords described above. The cords are disposed at an angle of 70 to 90 degrees with respect to the circumferential direction of the tire. On the inner or outer side of the carcass, another reinforcing layer may be provided for reinforcement of the bead portion, a sidewall portion or the like. This reinforcing layer may also be formed of the composite cord of the present invention, or it may be formed of a steel cord, aramid fiber cord, polyester fiber cord or nylon fiber cord.

Bead apex 14 provided between carcass 11 and its turn-up portion 11a may be formed of conventionally employed hard rubber, soft rubber or combination thereof. A filler may also be provided in the vicinity of an upper end of the turn-up portion of the carcass so as to restrict separation between the rubber and the metal cords embedded in the carcass ply.

The belt structure 12 of the pneumatic radial tire for truck or bus of the present invention is normally formed of four plies. Conventionally, in the belt plies of the pneumatic radial tire for truck or bus, cords are disposed at an angle of 5 to 30 degrees with respect to the circumferential direction of the tire. However, it is possible to arrange such that the belt ply adjoining the carcass ply has the cord angle of 40 to 70 degrees while the other three plies have the cord angle in the normal range between 5° and 30°. Cords that can be utilized for the belt plies include, besides the composite cord of the present invention, conventional inorganic fiber cords, such as a steel cord and a glass fiber cord, and any combination of the inorganic fiber cord with an aramid, nylon or polyester fiber cord.

A so-called band layer may also be provided radially outwardly of the belt structure, in which the cord angle is not greater than 5° with respect to the circumferential direction of the tire.

EXAMPLES

Examples 1–3

Comparative Examples 1–3 (Application to Belt Structure)

Steel filaments and polymer fiber as specified in Table 1 were twisted together to make various kinds of composite cords. These composite cords were used to fabricate respective belt structures as specified in Table 1, with each of which a radial tire of a size of 165/70SR13 for passenger car having a structure as shown in FIG. 3 was manufactured by trial. In each tire, two carcass plies reinforced with polyester cords were used, where the cords were arranged at an angle of 90° with respect to the circumferential direction of the tire. Performance evaluation of the tires was conducted as described below. The evaluation results are also shown in Table 1.

Example 4

Comparative Example 4 (Application to Carcass)

Steel filaments and polymer fiber as specified in Table 2 were twisted together to make respective composite cords. The composite cords were used to fabricate the carcasses as specified in Table 2, with each of which a radial tire of a size of 11R22.5 for truck or bus having a structure as shown in FIG. 4 was manufactured by trial. The cords in the carcass were arranged at an angle of 90° with respect to the circumferential direction of the tire. Performance evaluation of the tires was conducted as described below. The evaluation results are also shown in Table 2.

(1) Rubber Penetration

From each tire having its belt structure or carcass reinforced with the steel cord, the steel cord was taken out with the topped rubber attached thereto. The rubber was removed as much as possible from the surface of the cord. Moving a knife from the cut surface of the cord along its longitudinal direction, two neighboring filaments out of the five or six filaments included therein were separated from the remaining portion. It was then examined whether the void that had been created between the removed filaments and the remaining portion was fully filled with rubber. For a segment of the cord of about 10 cm long, the length of the portion fully filled with rubber was measured. Here, the rubber penetration is defined as a ratio of the length of the portion filled with rubber with respect to the full length of the segment (10 cm). The measurement was conducted for 10 segments for each cord, and the mean value thereof was employed as a measurement value of the cord.

(2) Rust Formation Index in Cord in Tire after Running

Each tire after running about 200 thousand kilometers was decomposed to examine rust formation in the steel cord. The measurements were represented as indices with that for the comparative cord being set to 100. The smaller index indicates the better result with less rust observed.

(3) Cord Strength Retention in Tire after Running

Each tire after running about 200 thousand kilometers was decomposed to take out the steel cord therefrom to measure the cord strength retention. The measurements were represented as indices each with the strength of the same cord before running of the tire being set to 100. The larger index indicates the better result.

(4) Rolling Resistance

The rolling resistance was measured according to SAE J 1269. The measurements were represented as indices with the rolling resistance value of a conventional case being set to 100. The smaller index indicates the smaller rolling resistance.

(5) Economical Efficiency

A cord employing preformed metallic filaments or a cord requiring complex twisting as in an open structure was determined poor (x) in economical efficiency. Other cords were determined good (O) in economical efficiency.

TABLE 1

|  |  | Comparative example 1 | Comparative example 2 | Comparative example 3 | Example 1 | Example 2 | Example 3 |
|---|---|---|---|---|---|---|---|
| Steel filament | Number of steel filaments | 4 | 6 | 4 | 4 | 4 | 6 |
|  | Steel filament diameter (mm) | 0.27 | 0.20 | 0.27 | 0.27 | 0.27 | 0.20 |
|  | Cross section of steel filament | round | round | round | round | elliptical | round |
| Polymer Fiber | Material | — | — | — | low-density PE | low-density PE | low-density PE |
|  | Number of fiber | — | — | — | 1 | 1 | 3 |
|  | Fiber structure | — | — | — | monofilament | monofilament | multifilament |
| Composite cord | Cord construction | 1 × 4 | 1 × 6 | 1 × 4 *1) | 1 × 5 | 1 × 5 | 1 × 9 |
|  | Number of steel filaments + fiber | 4 | 6 | 4 | 4 + 1 | 4 + 1 | 6 + 3 |
|  | Twist pitch (mm) | 15 | 18 | 15 | 15 | 15 | 18 |
| Belt structure | Number of plies | 2 | 2 | 2 | 2 | 2 | 2 |
|  | Cord angle (with respect to circumferential direction of tire) | +20, −20 | +20, −20 | +20, −20 | +20, −20 | +20, −20 | +20, −20 |
|  | End count per 5 cm | 40 | 25 | 40 | 40 | 40 | 25 |
| Performance | Rubber penetration (%) | 0 | 45 | 93 | 98 | 97 | 99 |
|  | Rust formation index in cord | 100 | 85 | 21 | 9 | 10 | 8 |
|  | Cord strength retention in tire after running (index) | 100 | 99 | 91 | 101 | 102 | 99 |
|  | Rolling resistance (index) | 100 | 98 | 95 | 100 | 100 | 100 |
|  | Economical efficiency | ○ | ○ | X | ○ | ○ | ○ |

*1) Waved in two dimensions; pitch of wave: 4.50 mm; height of wave: 0.40 mm

TABLE 2

|  |  | Comparative example 4 | Example 4 |
|---|---|---|---|
| Steel filament | Number of steel filaments | 9 | 9 |
|  | Steel filament diameter (mm) | 0.20 | 0.20 |
|  | Cross section of steel filament | round | round |
| Polymer fiber | Material | — | low-density PE |
|  | Number of fiber | — | 4 |
|  | Fiber structure | — | monofilament |
| Composite cord | Cord construction | 1 × 9 | 1 × 9 |
|  | Number of steel filaments + fiber | 9 | 9 + 4 |
|  | Twist pitch (mm) | 20 | 20 |
| Carcass | Number of plies | 1 | 1 |
|  | End count per 5 cm | 30 | 30 |
| Belt structure *1) | Number of plies | 4 | 4 |
|  | End count per 5 cm | 24 | 24 |
|  | Steel cord construction | 2 + 7 | 2 + 7 |
|  | Steel filament diameter (mm) | 0.22 | 0.22 |
| Performance | Rubber penetration (%) | 43 | 95 |
|  | Rust formation index in cord | 100 | 21 |
|  | Cord strength retention in tire after running (index) | 100 | 100 |
|  | Economical efficiency | ○ | ○ |

*1) Cords in respective belt plies are disposed, from inner ply to outer ply, +65°, +20°, −20° and −20° with respect to circumferential direction of tire.

Tables 1 and 2 clearly show that Examples 1–4 of the present invention allow substantially perfect rubber penetration, and are also excellent in rust formation index, cord strength retention, rolling resistance, and economical efficiency in the manufacture of tire.

According to the present invention, a composite cord is made with metallic filaments and polymer fiber twisted together. When the cord is being used for a reinforcing element of a tire, the polymer fiber softens or melts at the temperature condition of vulcanization. The melted material of the polymer fiber as well as the rubber completely coats the metallic filaments, thereby preventing formation of voids as found in the conventional compact metal cord. Accordingly, rust formation in the composite cord is restricted, and the cord strength is retained. Economical efficiency in the tire manufacturing process is also improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite cord having a 1×n construction where n is an integer from 3 to 12 with from 2 to 11 metallic filaments and from 1 to 5 polymer fibers selected from the group consisting of polyethylene fiber and polypropylene fiber having a melting point of from 50° C. to 200° C. twisted together, wherein no fiber constitutes a core of the composite cord and where polymer fibers are positioned between at least some peripherally adjacent metallic filaments such that at least some polymer fibers are not totally surrounded by metallic filaments whereby gaps are formed between at least some peripherally adjacent metallic filaments after the polymer fibers are softened or melted under vulcanization conditions.

2. The composite cord (1) according to claim 1, wherein the metallic filament (M) has a diameter of from 0.15 mm to 0.45 mm.

3. A pneumatic tire employing for its reinforcing element a composite cord having a 1×n construction (n is an integer from 3 to 12) with from 2 to 11 metallic filaments and from 1 to 5 polymer fibers having a melting point of from 50° C. to 200° C. twisted together.

4. The composite cord according to claim 1, wherein the polymer fiber and metallic filaments are twisted together at approximately constant pitches and displaced from one another in a longitudinal direction.

5. The pneumatic tire according to claim 3, wherein the polymer fiber and metallic filaments are twisted together at approximately constant pitches and displaced from one another in a longitudinal direction.

6. The composite cord according to claim 1, wherein the metallic filaments do not form a sheath around the core.

7. The composite cord according to claim 3, wherein the metallic filaments do not form a sheath around the core.

8. A pneumatic tire comprised of a carcass employing for its reinforcing element a composite cord having a 1×n construction where n is an integer from 3 to 12 with from 2 to 11 metallic filaments and from 1 to 5 polymer fibers having a melting point of from 50° C. to 200° C. twisted together, wherein no fiber constitutes a core of the composite cord and where polymer fibers are positioned between at least some peripherally adjacent metallic filaments such that at least some polymer fibers are not totally surrounded by metallic filaments whereby gaps are formed between at least some peripherally adjacent metallic filaments after the polymer fibers are softened or melted under vulcanization conditions, the end count of said composite cords per 50 mm width of said carcass ranging from 10–55.

9. The pneumatic tire of claim 8, wherein said end count ranges from 20–45.

10. A composite cord having a 1×n construction where n is an integer from 3 to 12 with from 2 to 11 metallic filaments and from 1 to 5 polymer fibers having a melting point of from 50° C. to 200° C. twisted together, wherein no fiber constitutes a core of the composite cord and where polymer fibers are positioned between at least some peripherally adjacent metallic filaments such that at least some polymer fibers are not totally surrounded by metallic filaments whereby gaps are formed between at least some peripherally adjacent metallic filaments after the polymer fibers are softened or melted under vulcanization conditions, said polymer fibers and metallic filaments being twisted together at approximately constant pitches, while being displaced from one another in a longitudinal direction to prevent any fiber or filament from forming a core of the composite cord.

11. A carcass of a pneumatic tire comprised of a composite cord having a 1×n construction where n is an integer from 3 to 12 with from 2 to 11 metallic filaments and from 1 to 5 polymer fibers having a melting point of from 50° C. to 200° C. twisted together, wherein no fiber constitutes a core of the composite cord and where polymer fibers are positioned between at least some peripherally adjacent metallic filaments such that at least some polymer fibers are not totally surrounded by metallic filaments whereby gaps are formed between at least some peripherally adjacent metallic filaments after the polymer fibers are softened or melted under vulcanization conditions.

12. The pneumatic tire of claim 8, wherein said polymer fibers are selected from the group consisting of polyethylene fiber and polypropylene fiber.

13. The composite cord of claim 10, wherein said polymer fibers are selected from the group consisting of polyethylene fiber and polypropylene fiber.

14. The carcass of claim 11, wherein said polymer fibers are selected from the group consisting of polyethylene fiber and polypropylene fiber.

* * * * *